US005726234A

United States Patent [19]
Herbst et al.

[11] Patent Number: 5,726,234
[45] Date of Patent: Mar. 10, 1998

[54] STABILIZED PVDC-CONTAINING PVC

[75] Inventors: Heinz Herbst, Lautertal; Kurt Hoffmann, Wachenheim; Rudolf Pfaendner, Lautertal, all of Germany

[73] Assignee: Ciba Specialty Chemicals Corporation, Tarrytown, N.Y.

[21] Appl. No.: 776,911

[22] PCT Filed: Aug. 4, 1995

[86] PCT No.: PCT/EP95/03110
§ 371 Date: Feb. 12, 1997
§ 102(e) Date: Feb. 12, 1997

[87] PCT Pub. No.: WO96/05247
PCT Pub. Date: Feb. 22, 1996

[30] Foreign Application Priority Data

Aug. 15, 1994 [CH] Switzerland .................. 2512/94

[51] Int. Cl.$^6$ .................. C08K 3/18; C08K 5/04; C08K 5/09
[52] U.S. Cl. .................. 524/430; 524/357; 524/399; 524/400; 524/425; 524/432; 524/433; 524/436
[58] Field of Search .................. 524/357, 399, 524/400, 425, 430, 432, 433, 436, 437

[56] References Cited

U.S. PATENT DOCUMENTS

| | | | |
|---|---|---|---|
| 3,481,912 | 12/1969 | Vanderbilt et al. | 260/87.7 |
| 4,877,821 | 10/1989 | Hall et al. | 523/351 |
| 5,075,355 | 12/1991 | Hall et al. | 523/351 |

FOREIGN PATENT DOCUMENTS 4133582  4/1993  Germany .

OTHER PUBLICATIONS

Patterson, et al., Journal of Vinyl Technology, Mar. 1994, vol. 16, No. 1, pp. 46–51.

*Primary Examiner*—Kriellion S. Morgan
*Attorney, Agent, or Firm*—Victoria M. Malia; Luther A. R. Hall

[57] ABSTRACT

The invention relates to stabilized PVDC-containing PVC, preferably a PVC recyclate, comprising as polymer at least 50% by weight of polyvinyl chloride (PVC) and 0.05–50% by weight of PVDC and additionally comprising at least one inorganic compound of the series of the metal oxides, metal hydroxides or metal carbonates.

12 Claims, No Drawings

STABILIZED PVDC-CONTAINING PVC

The present invention relates to a stabilised PVDC-containing PVC, preferably a PVC recyclate, as well as to a process for stabilising such polymers.

Copolymers based on vinylidene chloride (PVDC), typically comprising vinyl chloride, acrylonitrile, acrylates or ethylene as comonomers, are important coating materials as barrier layers for films (PVC films) for packaging food, pharmaceuticals and other substances. This barrier layer is intended to reduce file permeability of the packaging film e.g. for water, oxygen, fats, gases and aromatic substances. Further details concerning PVDC may be found in H. Domininghaus, Die Kunststoffe und ihre Eigenschaften, VDI-Verlag, Dsseldorf, 4th ed., 1992, pages 219ff and in M. C. Patterson and D. L. Dunkelberger, Additives for Processing Rigid PVDC Copolymers, J. of Vinyl Technology, March 1994, Vol. 16, pages 46–51.

The recycling of the multilayer films, which may also be combined with other films, e.g. aluminium foils, and their reuse for processing to new products, typically by extrusion and injection moulding (in particular at a processing temperature above 170 C.), give rise to problems resulting from degradation and discoloration (HCl evolution, corrosion problems), even at very low concentrations of PVDC. The standard PVC stabilisers based, for example, on Ca/Zn, do not effect sufficient stabilisation.

U.S. Pat. No. 5,075,355 discloses a process for the stabilisation of recycled PVDC-containing films. In addition to the use of a carrier polymer and a pyrophosphate, said process requires the use of a metal hydroxide complex of the hydrotalcite type.

Accordingly, it is the object of this invention to meet the continuing need for the provision of stabilised PVDC-containing PVC, preferably a PVC recyclate, which may be used for recycling without marked discoloration and/or while preserving the mechanical properties in an economic and technically feasable manner.

It has now been found that it is possible to stabilise PVDC-containing PVC, preferably a PVC recyclate, in simple and economic manner with an inorganic compound of the metal oxide, metal hydroxide or metal carbonate series against thermal-oxidative degradation during processing and subsequent use.

The invention relates to stabilised PVDC-containing PVC, preferably a PVC recyclate, comprising as polymer at least 50% by weight of polyvinyl chloride (PVC) and 0.05–50% by weight of PVDC and additionally comprising at least one inorganic compound of the series of the metal oxides, metal hydroxides or metal carbonates.

Preferred stabilised PVDC-containing PVC, in particular a PVC recyclate, is that comprising as polymer at least 80% by weight of polyvinyl chloride (PVC) and 0.05–20% by weight of PVDC and particularly preferred stabilised PVDC-containing PVC, in particular a PVC recyclate, is that comprising as polymer at least 90% by weight of polyvinyl chloride (PVC) and 0.1–10% by weight of PVDC.

The polymers stabilised according to the practice of this invention are distinguished by excellent colour stability and exhibit only minor tendency to striation when injection moulded.

The PVDC-containing PVC recyclate consists, for example, of film waste from the production of multilayer films, or also of film blends from useful material collections.

The recyclate may also contain minor amounts of foreign material such as paper, pigments, adhesives, adhesion promoters (e.g. EVA), foreign polymers (e.g. polyolefins), which are often difficult to remove. These foreign materials may also originate from contact with diverse materials during use or working up, typically paint components, traces of metal or also of water.

Within the scope of this invention PVC will also be taken to mean copolymers or graft polymers of PVC with polymerisable compounds such as acrylonitrile, vinyl acetate or ABS, which polymers may be suspension, mass or emulsion polymers. However, PVC does not embrace copolymers with vinylidene chloride. PVC is preferably in the form of a suspension polymer, a mass polymer and an emulsion polymer.

Preferred PVDC-containing PVC, preferably a PVC recyclate, is that comprising a metal oxide, metal hydroxide or metal carbonate of one of the elements of the 2nd and 4th main groups and of the 2nd, 4th and 7th auxiliary group of the Periodic System. Particularly preferred metals are barium, calcium, magnesium, zinc, titanium, lead, tin and manganese, the oxides and hydoxides in turn being particularly preferred, typically CaO, MgO, BaO, ZnO, $TiO_2$, $MnO_2$, PbO, $PbO_2$, SnO, $SnO_2$, $Ba(OH)_2$, $Mg(OH)_2$ and $Ca(OH)_2$. Calcium oxide and calcium hydroxide are most preferred.

Typical examples of metal hydroxides are magnesium hydroxide and calcium hydroxide, and a typical example of a metal carbonate is calcium carbonate.

It is also possible to use a mixture of different compounds, for example a mixture of calcium oxide and calcium hydroxide.

The novel PVDC-containing PVC, preferably a PVC recyclate, conveniently comprises 0.05 to 10 parts by weight, preferably 0.1 to 5 parts by weight and, most preferably, 0.1 to 3 parts by weight, based on 100 parts of polymer, of an inorganic compound of the series of the metal oxides, metal hydroxides or metal carbonates.

In a preferred embodiment of the invention, the novel PVDC-containing PVC, preferably a PVC recyclate, comprises further additives: These further additives are in particular: metal salts of fatty acids and 1,3-diketo compounds, which are preferred, as well as plasticisers (e.g. those disclosed in EP-A 0 421 933, p. 22, line 58 to p. 23, line 53), epoxy resins (e.g. those disclosed in EP-A 0 421 933, p. 32, line 17 to p. 32, line 24, and in EP-application No. 94810199.3), fillers and reinforcing agents (for example silicates, glass fibres, talcum, kaolin, chalk, mica, carbon black or graphite), antioxidants (preferably phenolic antioxidants, such as those disclosed in EP-A 0 421 933, p. 24, line 58 to p. 25, line 45), polyols (e.g. those disclosed in EP-A 0 421 933, p. 24, line 50 to p. 24, line 55), zeolites (e.g. those disclosed in EP application No. 94 810 199.3), hydrotalcites (e.g. those disclosed in EP-A 0 421 933, p. 3, line 9 to p. 3, line 45, and in EP application No. 94 810 199.3), organic phosphites and phosphonites (e.g. those disclosed in EP-A 0 421 933, p. 24, line 9 to p. 24, line 35), dihydropyridines, sterically hindered amines (HALS) (e.g. those disclosed in EP-A 0 421 933, p. 6, line 26 to p. 21, line 2), light stabilisers (e.g. those disclosed in EP-A 0 421 933, p. 25, line 46 to p. 26, line 16), UV absorbers (e.g. those disclosed in EP-A 0 421 933, p. 25, line 46 to p. 26, line 16), lubricants, tin stabilisers, fatty acid esters, paraffins, blowing agents, fluorescent whitening agents, pigments, flame retardants, antistatic agents, b-aminocrotonates (such as those mentioned in EP-A 0 465 405, p. 6, lines 9–14), phosphates, thiophosphates, gelling agents, peroxide-scavengers (e.g. those disclosed in EP-A 0 421 933, p. 26, line 25 to p. 26, line 28), modifiers and further chelating agents for Lewis acids. Further details and examples of the cited additives may be found in Gächter/Müller, Plastics Additives Handbook; 3rd ed. 1990, in particular in chapters 4 and 5; in EP-A 0 421 933 and EP publication No. 625 546.

These further additives may be used in an amount of, for example, 0.01 to 20, conveniently of 0.01 to 10 and, preferably, of 0.01 to 5 parts by weight, based on 100 parts by weight of polymer.

The metal of a metal salt of a fatty acid is particularly suitably an element of the 2nd main or auxiliary group as well as aluminium or tin.

These salts may be in particular tin or, preferably, calcium, zinc, magnesium or aluminium salts of the series of the aliphatic saturated $C_2-C_{22}$carboxylates, of the series of the aliphatic olefinic $C_3-C_{22}$carboxylates, of the series of the aliphatic $C_2-C_{22}$carboxylates, which are substituted by at least one OH group, of the series of the cyclic or bicyclic $C_5-C_{22}$carboxylates, of the series of the aromatic $C_7-C_{22}$carboxylates, of the series of the aromatic $C_7-C_{22}$carboxylates, which are substituted by at least one OH group, of the series of the $C_1-C_{16}$alkyl-substituted phenylcarboxylates and of the series of the phenyl-$C_1-C_{16}$alkylcarboxylates, among which the behenates and, more particularly, stearates, oleates and laurates are preferred.

It is very particularly preferred to use calcium stearate, magnesium stearate, aluminium stearate, zinc octoate, zinc oleate, zink stearate and zinc laurate.

It is also possible to use a mixture of different metal salts.

The metal salt of a fatty acid can be used in an amount of typically 0.01 to 10, conveniently of 0.01 to 2 and, preferably, of 0.1 to 1 parts by weight, based on 100 parts by weight of polymer.

Useful 1,3-dicarbonyl compounds may be linear or cyclic dicarbonyl compounds. It is preferred to use dicarbonyl compounds of formula I,

wherein $R_1$ is $C_1-C_{22}$alkyl, $C_5-C_{10}$hydroxyalkyl, $C_2-C_{18}$alkenyl, phenyl; phenyl which is substituted by OH, $C_1-C_4$alkyl, $C_1-C_4$alkoxy or halogen, $C_7-C_{10}$phenylalkyl, $C_5-C_{12}$cycloalkyl, $C_1-C_4$alkyl-substituted $C_5-C_{12}$cycloalkyl, or a group —$R_5$—S—$R_6$ or —$R_5$—O—$R_6$. $R_2$ is hydrogen, $C_1-C_8$alkyl, $C_2-C_{12}$alkenyl, phenyl, $C_7-C_{12}$alkylphenyl, $C_7-C_{10}$phenylalkyl or a group —CO—$R_4$. $R_3$ has one of the meanings given for $R_1$ or is $C_1-C_{18}$alkoxy, $R_4$ is $C_1-C_4$alkyl or phenyl, $R_5$ is $C_1-C_{10}$alkylene, and $R_6$ is $C_1-C_{12}$alkyl, phenyl, $C_7-C_{18}$alkylphenyl or $C_7-C_{10}$phenylalkyl.

These compounds comprise the hydroxyl group-containing diketones disclosed in EP-A-346 279 and the oxadiketones and thiadiketones disclosed in EP-A-307 358 as well as the diketones based on isocyanic acid disclosed in U.S. Pat. No. 4,339,383.

$R_1$ and $R_3$ defined as alkyl are preferably $C_1-C_{18}$alkyl, typically methyl, ethyl, n-propyl, isopropyl, n-butyl, tert-butyl, pentyl, hexyl, heptyl, octyl, decyl, dodecyl or octadecyl.

$R_1$ and $R_3$ defined as hydroxyalkyl are preferably a group —(CH$_2$)$_n$—OH, wherein n is 5, 6 or 7.

$R_1$ and $R_3$ defined as alkenyl may typically be vinyl, allyl, methallyl, 1-butenyl, 1-hexenyl or oleyl. Allyl is preferred.

$R_1$ and $R_3$ defined as phenyl which is substituted by OH, alkyl, alkoxy or halogen may typically be tolyl, xylyl, tert-butylphenyl, methoxyphenyl, ethoxyphenyl, hydroxyphenyl, chlorophenyl or dichlorophenyl.

$R_1$ and $R_3$ defined as phenylalkyl are preferably benzyl. $R_2$ and $R_3$ defined as cycloalkyl or alkylcycloalkyl are preferably cyclohexyl or methylcyclohexyl.

$R_2$ defined as alkyl is preferably $C_1-C_4$alkyl. $R_2$ defined as $C_2-C_{12}$alkenyl is preferably allyl. $R_2$ defined as alkylphenyl is preferably tolyl. $R_2$ defined as phenylalkyl is preferably benzyl. $R_2$ is preferably hydrogen. $R_3$ defined as alkoxy may typically be methoxy, ethoxy, butoxy, hexyloxy, octyloxy, dodecyloxy, tridecyloxy, tetradecyloxy or octadecyloxy. $R_5$ defined as $C_1-C_{10}$alkylene is preferably $C_2-C_4$alkylene. $R_6$ defined as alkyl is preferably $C_4-C_{12}$alkyl, typically butyl, hexyl, octyl, decyl or dodecyl. $R_6$ defined as alkylphenyl is preferably tolyl. $R_6$ defined as phenylalkyl is preferably benzyl.

Typical examples of 1,3-dicarbonyl compounds of formula I are acetyl acetone, butanoyl acetone, heptanoyl acetone, stearoyl acetone, palmitoyl acetone, lauroyl acetone, 7-tert-nonylthioheptane-2,4-dione, benzoyl acetone, dibenzoylmethane, lauroylbenzoyl-methane, palmitoylbenzoylmethane, stearoylbenzoylmethane, 5-hydroxycapronylbenzoyl-methane, tribenzoylmethane, bis(4-methylbenzoyl)methane, benzoyl-p-chlorobenzoyl-methane, bis-(2-hydroxybenzoyl)methane, 4-methoxybenzoylbenzoylmethane, bis-(4-methoxybenzoyl)methane, 1-benzoyl-1-acetylnonane, benzoylacetylphenylmethane, stearoyl-4-methoxybenzoylmethane, bis(4-tert-butylbenzoyl)methane, benzoylformyl-methane, benzoylphenylacetylmethane, bis(cyclohexanoyl)methane, bis(pivaloyl)methane, methyl acetate, ethyl acetate, hexyl acetate, octyl acetate, dodecyl acetate or octadecyl acetate, ethyl benzoyl acetate, butyl benzoyl acetate, 2-ethylhexyl benzoyl acetate, dodecyl benzoyl acetate or octadecyl benzoyl acetate, ethyl stearoyl acetate, propyl stearoyl acetate, butyl stearoyl acetate, hexyl stearoyl acetate or octyl stearoyl acetate, and dehydracetic acid as well as the zinc or magnesium salts thereof.

Preferred 1,3-diketo compounds are those of formula I, wherein $R_1$ is $C_1-C_{18}$alkyl, phenyl; phenyl which is substituted by OH, methyl or methoxy, $C_7-C_{10}$phenylalkyl or cyclohexyl, $R_2$ is hydrogen and $R_3$ has one of the meanings given for $R_1$.

It is also possible to use a mixture of different 1,3-diketo compounds.

The 1,3-diketo compounds can be used in an amount of typically 0.01 to 10, conveniently of 0.01 to 2 and, preferably, of 0.01 to 1 parts by weight, based on 100 parts by weight of polymer.

It is also preferred to use stabilised PVDC-containing PVC, preferably a PVC recyclate, as described above, additionally containing calcium oxide and at least one additive selected from the group consisting of the metal salts of fatty acids, 1,3-diketo compounds, plasticisers, epoxides, fillers and reinforcing agents (such as silicates, glass fibres, talcum, kaolin, chalk, mica, carbon black or graphite), antioxidants (preferably phenolic antioxidants), polyols, zeolites, hydrotalcites, organic phosphites and phosphonites, dihydropyridines, sterically hindered amines (HALS), light stabilisers, UV absorbers, lubricants, tin stabilisers, fatty acid esters, paraffins, blowing agents, fluorescent whitening agents, pigments, flame retardants, antistatic agents, b-minocrotonates, phosphates, thiophosphates, gelling agents, peroxide-scavengers, modifiers and further chelating agents for Lewis acids.

Also preferred is stabilised PVDC-containing PVC, preferably a PVC recyclate, as described above, comprising calcium oxide and a metal salt of a fatty acid.

Also preferred is stabilised PVDC-containing PVC, preferably a PVC recyclate, as described above, comprising calcium oxide and a metal stearate, metal oleate and/or metal laurate.

Also preferred is stabilised PVDC-containing PVC, preferably a PVC recyclate, as described above, comprising calcium oxide and calcium stearate, zinc stearate and/or zinc laurate.

It is also preferred to use stabilised PVDC-containing PVC, preferably a PVC recyclate, as described above, comprising calcium oxide and a 1,3-diketo compound of formula I.

The invention further relates to a process for stabilising PVDC-containing PVC, preferably a PVC recyclate, comprising at least 50% by weight of polyvinyl chloride (PVC) and 0.05–50% by weight of PVDC, which process comprises adding to said polymer at least one inorganic compound of the series of the metal oxides, metal hydroxides or metal carbonates.

The invention also relates to the use of an inorganic compound of the series of the metal oxides, metal hydroxides or metal carbonates for stabilising PVDC-containing PVC, preferably a PVC recyclate, comprising at least 50% by weight of polyvinyl chloride (PVC) and 0.05–50% by weight of PVDC.

Preferred processes and the preferred utility correspond in their components, mixture ratios and polymer composition to the preferred meanings stated in detail with respect to the PVDC-containing PVC, preferably a PVC recyclate.

The addition of the stabiliser to the PVDC-containing PVC, preferably a PVC recyclate, makes possible thermoplastic processing with reduced degradation and/or prolongs the service life or preserves the mechanical properties of the materials prepared from the PVDC-containing PVC, preferably a PVC recyclate.

It is also possible to use further conventional PVC additives which improve processing or the material properties of the plastic blend.

The stabilised PVDC-containing PVC, preferably a PVC recyclate, of this invention can be prepared in per se known manner by mixing the cited stabilisers and optional further additives with the PVDC-containing PVC, preferably a PVC recyclate, by means of per se known apparatus such as calenders, mixers, kneaders, extruders and the like.

The inorganic compound of the series of the metal oxides, metal hydroxides or metal carbonates and, where appropriate, the cited additives can be used in compacted extruded form or on a substrate, or they may also be added direct to the PVDC-containing PVC as individual substances, mixtures or in the form of powders.

The PVDC-containing PVC, preferably a PVC recyclate, so obtained can be used for a wide range of purposes, e.g. again for films.

The recyclate can also be blended with virgin plastics or used together with virgin plastics, typically in a coextrusion process.

The invention is illustrated in more detail by the following Examples in which, as well as throughout the remainder of the description, parts and percentages are by weight, unless otherwise stated.

EXAMPLES 1–5

In a W 50 mixing chamber (Brabender plasticorder PL 2001/3; 46 rpm) a PVDC-coated PVC aluminium blister grinding stock (c. 8.5 mol % of PVDC) is kneaded for 5 minutes at 190° C. together with the additives of Tables 1 and 2.

The mixture is then taken out of the Brabender mixing chamber and premoulded at 30° C. and c. 50 kN 1 min. From these mouldings sheets of 2 mm are prepared at 180° C. and 50 kN.

After these two temperature treatments the difference to the white standard ($\Delta E$,) according to ASTM D 2244 is determined. The values listed in the following Tables 1 and 2 show that the novel recyclates are stabilised best (lowest $\Delta E$ values).

TABLE 1

| | Additives* | $\Delta E$ |
|---|---|---|
| Example 1 | 1.0 calcium oxide | 43.7 |
| Example 2 | 1.0 calcium hydroxide | 43.3 |
| Example 3 | 0.83 calcium oxide<br>0.085 AO-1<br>0.085 P-1 | 43.5 |
| Example 4 | 0.5 of a mixture of:<br>24.4% calcium oxide<br>29.0% calcium stearate<br>4.6% zinc stearate<br>6.6% stearoylbenzoylmethane<br>35.4% hydrotalcite | 43.0 |
| Comparison Example 1 | no additives | 64.1 |

*Additives: parts per 100 parts of polymer blend

TABLE 2

| | Additives* | $\Delta E$ |
|---|---|---|
| Example 5 | 1.0 of a mixture of:<br>21.0% calcium oxide<br>30.3% barium stearate<br>4.7% zinc stearate<br>7.0% stearoylbenzoylmethane<br>37.0% hydrotalcite | 51.0 |
| Comparison Example 1 | no additives | 64.0 |
| Comparison Example 2 | 1.0 sodium pyrophosphate | 60.0 |
| Comparison Example 3 | 1.5 sodium pyrophosphate | 60.0 |

*Additives: parts per 100 parts of polymer blend
The following additives are used:
AO-1 β-(3,5-di-tert-butyl-4-hydroxyphenyl)propionate of pentaerythritol
P-1 tris (2,4-di-tert-butylphenyl)phosphite

EXAMPLES 6+7

For homogenising and compounding, the grinding stock (see Examples 1–5) is extruded and granulated before injection moulding. Extrusion is carried out in a single screw extruder at 180° C. and 50 rpm, while the additives are incorporated in accordance with Table 3.

The granulate so obtained is injection moulded to dumbbell bars (test samples for tensile impact strength (80×40×4) ISO/DIN 3167) at 180° C., 200 rpm and 70 bar.

The difference to the white standard ($\Delta E$) is determined in accordance with ASTM D 2244. The values listed in Table 3 show that the novel recyclates are stabilised best (lowest $\Delta E$ values). Qualitative evaluation shows that the comparison sample exhibits black striation while the samples of this invention exhibit no striation.

TABLE 3

| | Additives* | $\Delta E$ |
|---|---|---|
| Example 6 | 0.5 calcium oxide | 28.5 |
| Example 7 | 1.0 of a mixture of:<br>62.2% calcium oxide<br>14.5% calcium stearate<br>2.3% zinc stearate<br>3.3% stearoylbenzoylmethane<br>17.7% hydrotalcite | 29.9 |
| Comparison Example 1 | no additives | 42.3 |

*Additives: parts per 100 parts of polymer blend

What is claimed is:
1. Stabilised PVDC-containing PVC, comprising as polymer at least 50% by weight of polyvinyl chloride (PVC) and

0.05–50% by weight of PVDC and additionally comprising at least one inorganic compound, wherein the inorganic compound is a metal oxide, metal hydroxide or racial carbonate of one of the elements of the 2nd and 4th main groups and of the 4th and 7th auxiliary groups of the Periodic System.

2. Stabilised PVDC-containing PVC according to claim 1, which is a recyclate.

3. Stabilised PVDC-containing PVC according to claim 1, comprising an polymer at least 80% by weight of polyvinyl chloride (PVC) and 0.05–20% by weight of PVDC.

4. Stabilised PVDC-containing PVC according to claim 1, wherein the inorganic compound is CaO, MgO, BaO, $TiO_2$, $MnO_2$, PbO, $PbO_2$, SnO, $SnO_2$, $Ba(OH)_2$, $Mg(OH)_2$ or $Ca(OH)_2$.

5. Stabilised PVDC-containing PVC according to claim 1, wherein the inorganic compound is CaO or $Ca(OH)_2$.

6. Stabilised PVDC-containing PVC according to claim 1, wherein the polymer contains 0.05 to 10 parts by weight of the inorganic compound, based on 100 parts of polymer.

7. Stabilised PVDC-containing PVC according to claim 1, wherein the polymer contains 0.1 to 3 parts by weight of the inorganic compound, based on 100 parts of polymer.

8. Stabilised PVDC-containing PVC according to claim 1, wherein the polymer additionally contains at least one additive selected from the group consisting of the metal salts of fatty acids, 1,3-diketo compounds, plasticisers, epoxides, fillers and reinforcing agents, antioxidants, polyols, zeolites, hydrotalcites, organic phosphites and phosphonites, dihydropyridines, sterically hindered amines (HALS), light stabilisers, UV absorbers, lubricants, tin stabilisers, fatty acid esters, paraffins, blowing agents, fluorescent whitening agents, pigments, flame retardants, antistatic agents, b-aminocrotonates, phosphates, thiophosphates, gelling agents, peroxide-scavengers, modifiers and further chelating agents for Lewis acids.

9. Stabilised PVDC-containing PVC according to claim 8, comprising calcium oxide and a metal stearate, metal oleate and/or metal laurate.

10. Stabilised PVDC-containing PVC according to claim 8, comprising calcium oxide and calcium stearate, zinc stearate and/or zinc laurate.

11. Stabilised PVDC-containing PVC according to claim 8, comprising calcium oxide and a 1,3-diketo compound of formula I

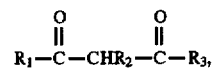

wherein $R_1$ is $C_1$–$C_{22}$alkyl, $C_5$–$C_{10}$hydroxyalkyl, $C_2$–$C_{18}$alkenyl, phenyl; phenyl which is substituted by OH, $C_1$–$C_4$alkyl, $C_1$–$C_4$alkoxy or halogen, $C_7$–$C_{10}$phenylalkyl, $C_5$–$C_{12}$cycloalkyl, $C_1$–$C_4$alkyl-substituted $C_5$–$C_{12}$cycloalkyl, or a group —$R_5$—S—$R_6$ or —$R_5$—O—$R_6$, $R_2$ is hydrogen, $C_1$–$C_8$alkyl, $C_2$–$C_{12}$alkenyl, phenyl, $C_7$–$C_{12}$alkylphenyl, $C_7$–$C_{10}$phenylalkyl or a group —CO—$R_4$, $R_3$ has one of the meanings given for $R_1$ or is $C_1$–$C_{18}$alkoxy, $R_4$ is $C_1$–$C_4$alkyl or phenyl, $R_5$ is $C_1$–$C_{10}$alkylene, and $R_6$ is $C_1$–$C_{12}$alkyl, phenyl, $C_7$–$C_{18}$alkylphenyl or $C_7$–$C_{10}$phenylalkyl.

12. A process for stabilising PVDC-containing PVC, comprising at least 50% by weight of polyvinyl chloride (PVC) and 0.05–50% by weight of PVDC, which process comprises adding thereto at least one inorganic compound, wherein the inorganic compound is a metal oxide, metal hydroxide or metal carbonate of one of the elements of the 2nd and 4th main groups und of the 4th and 7th auxiliary groups of the Periodic System.

* * * * *